US012100540B2

(12) United States Patent
Kim et al.

(10) Patent No.: US 12,100,540 B2
(45) Date of Patent: Sep. 24, 2024

(54) COIL DEVICE AND METHOD FOR MANUFACTURING THE SAME

(71) Applicant: STEMCO CO., LTD., Cheongju-si (KR)

(72) Inventors: Young Jun Kim, Cheongju-Si (KR); Chang Hoon Han, Sejong-Si (KR); Dong Gon Kim, Cheongju-Si (KR); Su Jeong Shin, Cheongju-Si (KR)

(73) Assignee: STEMCO CO., LTD., Cheongju-si (KR)

( * ) Notice: Subject to any disclaimer, the term of this patent is extended or adjusted under 35 U.S.C. 154(b) by 702 days.

(21) Appl. No.: 17/106,086

(22) Filed: Nov. 28, 2020

(65) Prior Publication Data

US 2021/0082614 A1 Mar. 18, 2021

Related U.S. Application Data

(63) Continuation of application No. PCT/KR2019/007944, filed on Jul. 1, 2019.

(30) Foreign Application Priority Data

Jul. 4, 2018 (KR) ........................ 10-2018-0077505

(51) Int. Cl.

*H01F 27/28* (2006.01)
*H01F 27/32* (2006.01)
*H01F 41/04* (2006.01)

(52) U.S. Cl.

CPC ....... *H01F 27/2804* (2013.01); *H01F 27/323* (2013.01); *H01F 41/041* (2013.01); *H01F 2027/2809* (2013.01)

(58) Field of Classification Search

CPC ......... H01F 27/2804; H01F 2027/2809; H01F 17/0013; H01F 17/0006; H01F 5/003; H01F 27/323

(Continued)

(56) References Cited

U.S. PATENT DOCUMENTS 7,041,526 B2 5/2006 Shim et al.
7,253,489 B2 * 8/2007 Na ........................ G01R 33/05 257/421

(Continued)

FOREIGN PATENT DOCUMENTS

CN 105428338 A 3/2016
CN 106252037 A 12/2016

(Continued)

OTHER PUBLICATIONS

An Office Action mailed by China National Intellectual Property Administration on Nov. 30, 2021, which corresponds to Chinese Patent Application No. 201980039146.8 and is related to U.S. Appl. No. 17/106,086.

(Continued)

*Primary Examiner* — Tszfung J Chan
(74) *Attorney, Agent, or Firm* — Studebaker & Brackett PC

(57) ABSTRACT

A coil device capable of minimizing defects and increasing a thickness of a conductor pattern is provided. The coil device includes: a base substrate; a seed pattern formed on the base substrate and including a seed region and a lead-in wiring region; a first conductive pattern formed on the seed (Continued)

region; a second conductive pattern formed on at least a portion of the first conductive pattern; and a protective layer formed to contact at least one or more of the base substrate, the seed pattern, the first conductive pattern, and the second conductive pattern, in which the seed pattern of the lead-in wiring region extends to a cut line.

8 Claims, 11 Drawing Sheets

(58) Field of Classification Search
USPC .................................................. 336/200, 232
See application file for complete search history.

(56) References Cited

U.S. PATENT DOCUMENTS

| | | | | |
|---|---|---|---|---|
| 10,217,563 | B2 | 2/2019 | Wang et al. | |
| 2005/0006713 | A1* | 1/2005 | Shim | G01R 33/05 257/421 |
| 2007/0230042 | A1* | 10/2007 | Fujiwara | H01F 17/0033 360/123.13 |
| 2007/0230049 | A1* | 10/2007 | Fujiwara | H01F 17/0013 360/123.01 |
| 2015/0035634 | A1* | 2/2015 | Nakamura | H01F 41/046 336/170 |
| 2016/0078998 | A1 | 3/2016 | Park et al. | |
| 2016/0086720 | A1* | 3/2016 | Jeong | H01F 27/292 336/200 |
| 2016/0163444 | A1* | 6/2016 | Choi | H01F 41/043 336/200 |
| 2017/0140866 | A1* | 5/2017 | Hong | H01F 27/255 |

FOREIGN PATENT DOCUMENTS

| | | | | | |
|---|---|---|---|---|---|
| JP | H05-75237 | A | | 3/1993 | |
| JP | 11-121221 | A | | 4/1999 | |
| JP | 2004319570 | A | * | 11/2004 | |
| JP | 2013125818 | A | * | 6/2013 | |
| KR | 2007082494 | A | * | 8/2007 | |
| KR | 10-2016-0004090 | A | | 1/2016 | |
| KR | 10-2016-0044947 | A | | 4/2016 | |
| KR | 10-1862503 | B1 | | 5/2018 | |
| KR | 1862503 | B1 | * | 5/2018 | H01F 17/0013 |
| KR | 10-2020-0004538 | A | | 1/2020 | |
| WO | WO-2016147993 | A1 | * | 9/2016 | H01F 17/0013 |

OTHER PUBLICATIONS

Office Action issued in TW 108123226; mailed by the Taiwan Intellectual Property Office on Feb. 20, 2020.

International Search Report issued in PCT/KR2019/007944; mailed Oct. 11, 2019.

An Office Action mailed by China National Intellectual Property Administration on Jun. 29, 2022, which corresponds to Chinese Patent Application No. 201980039146.8 and is related to U.S. Appl. No. 17/106,086.

* cited by examiner

[FIG. 1]
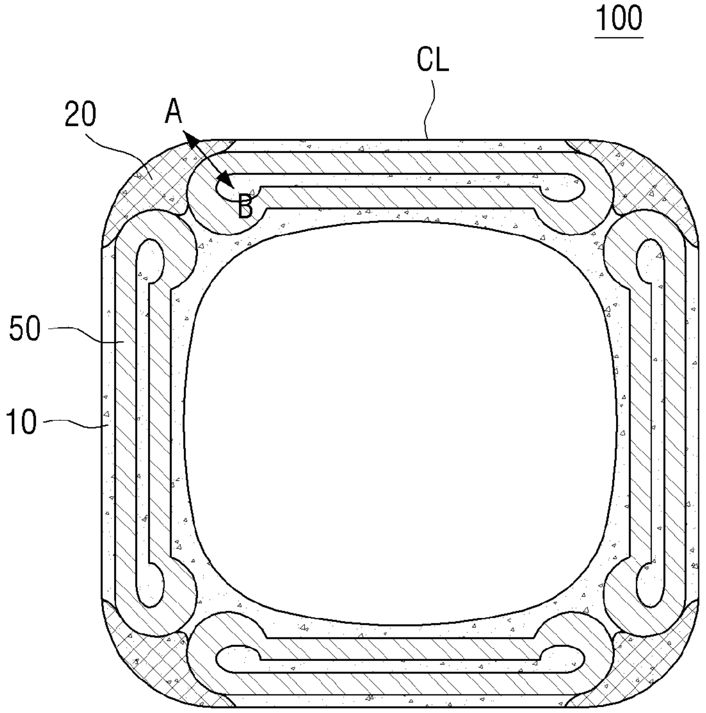
[FIG. 2]
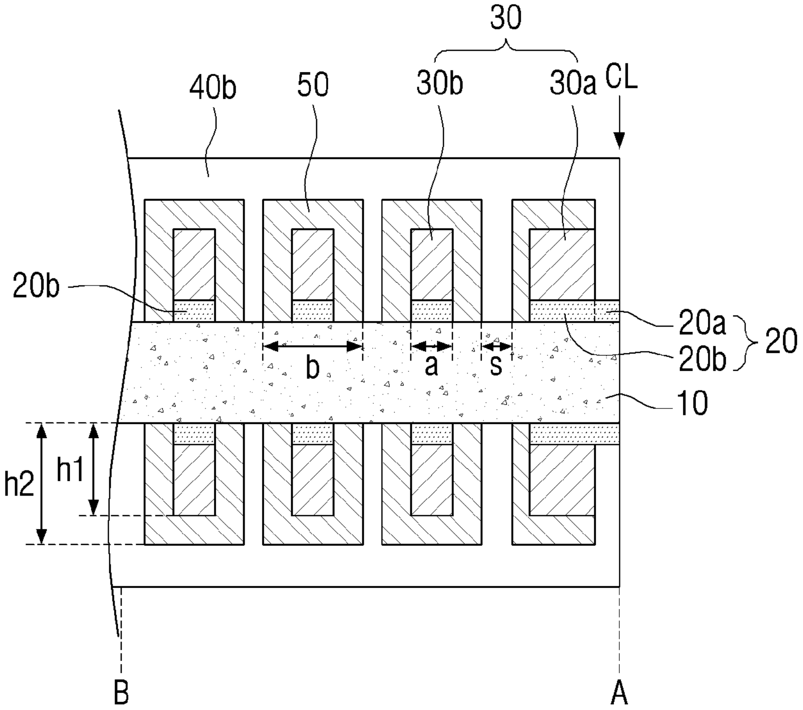

[FIG. 3]
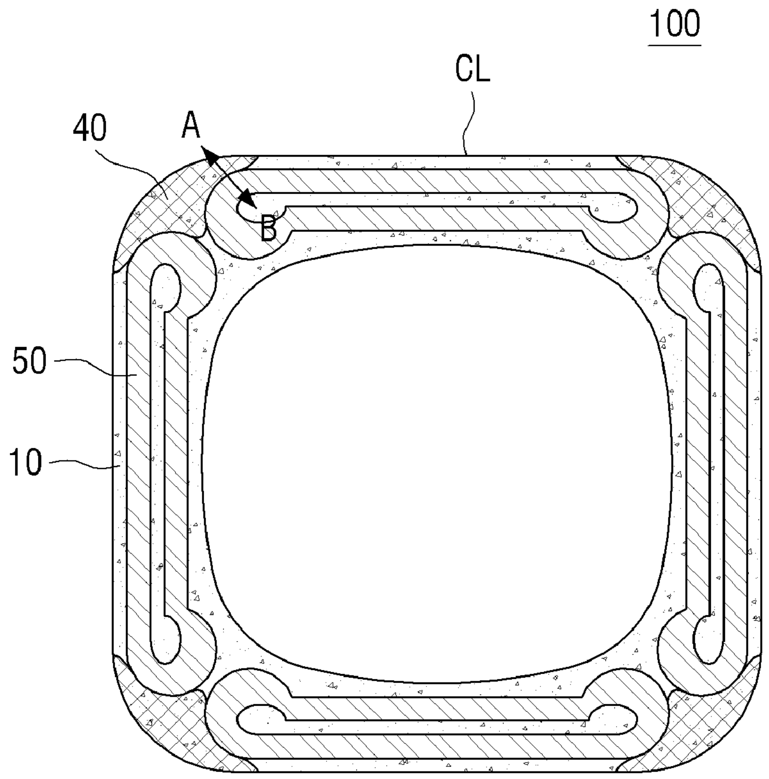

[FIG. 4A]
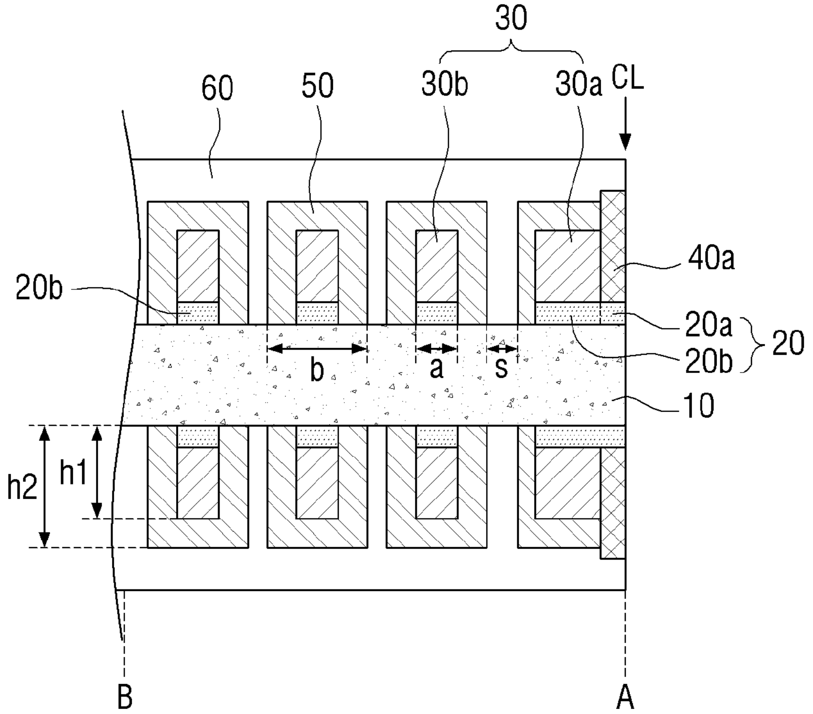
[FIG. 4B]
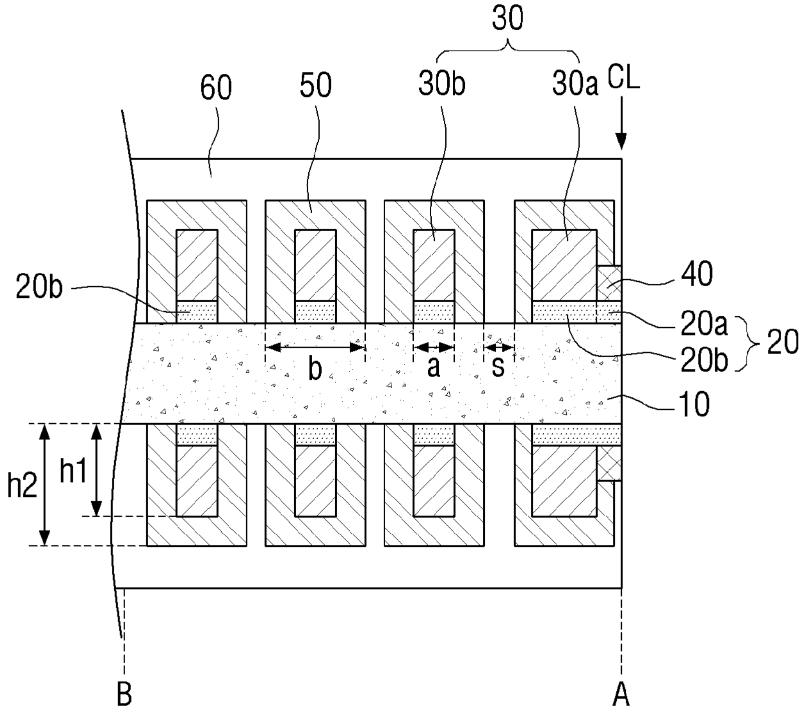

[FIG. 5]
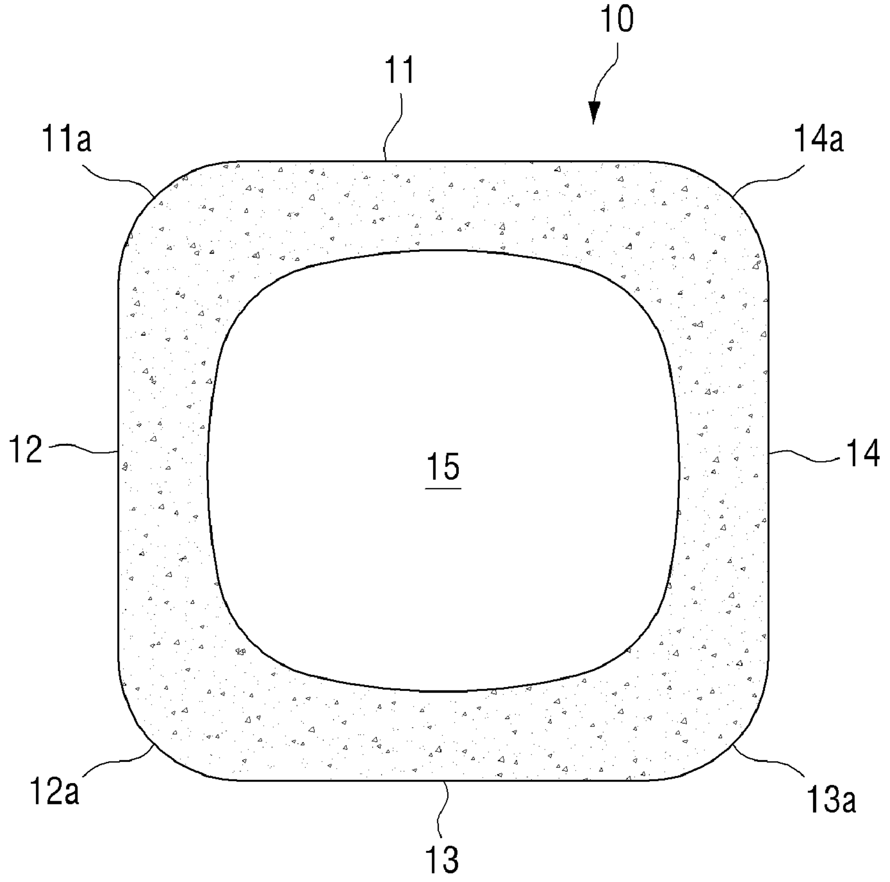

[FIG. 6A]
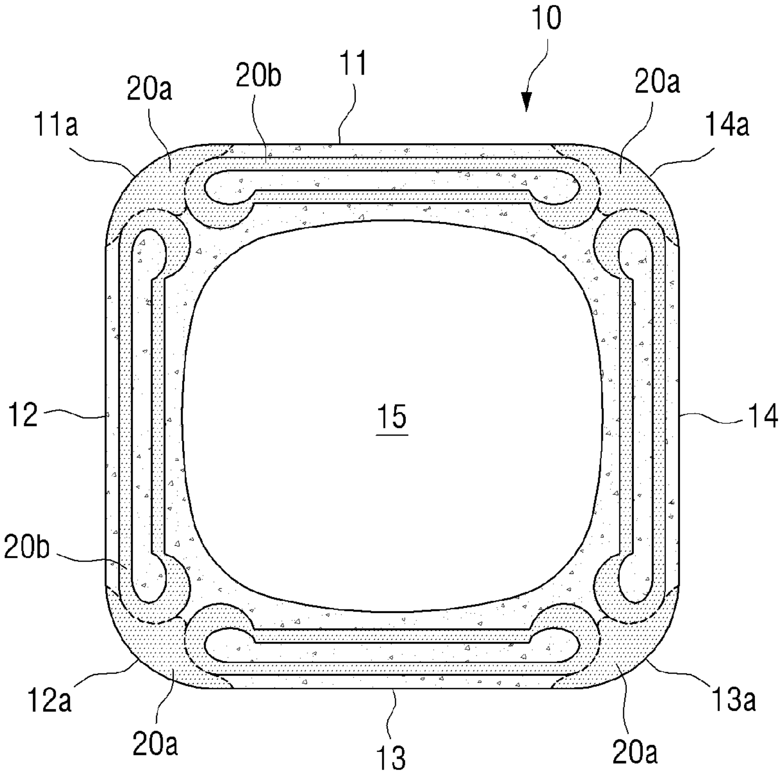
[FIG. 6B]
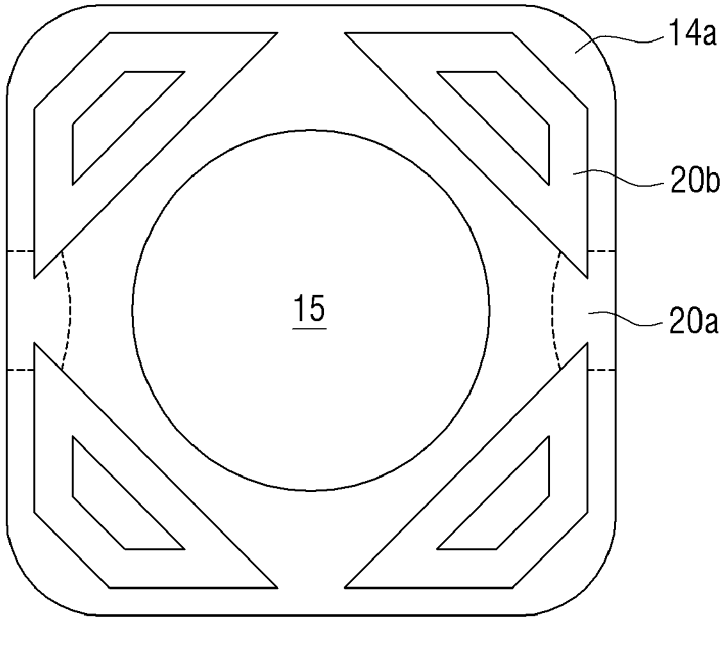

[FIG. 7]
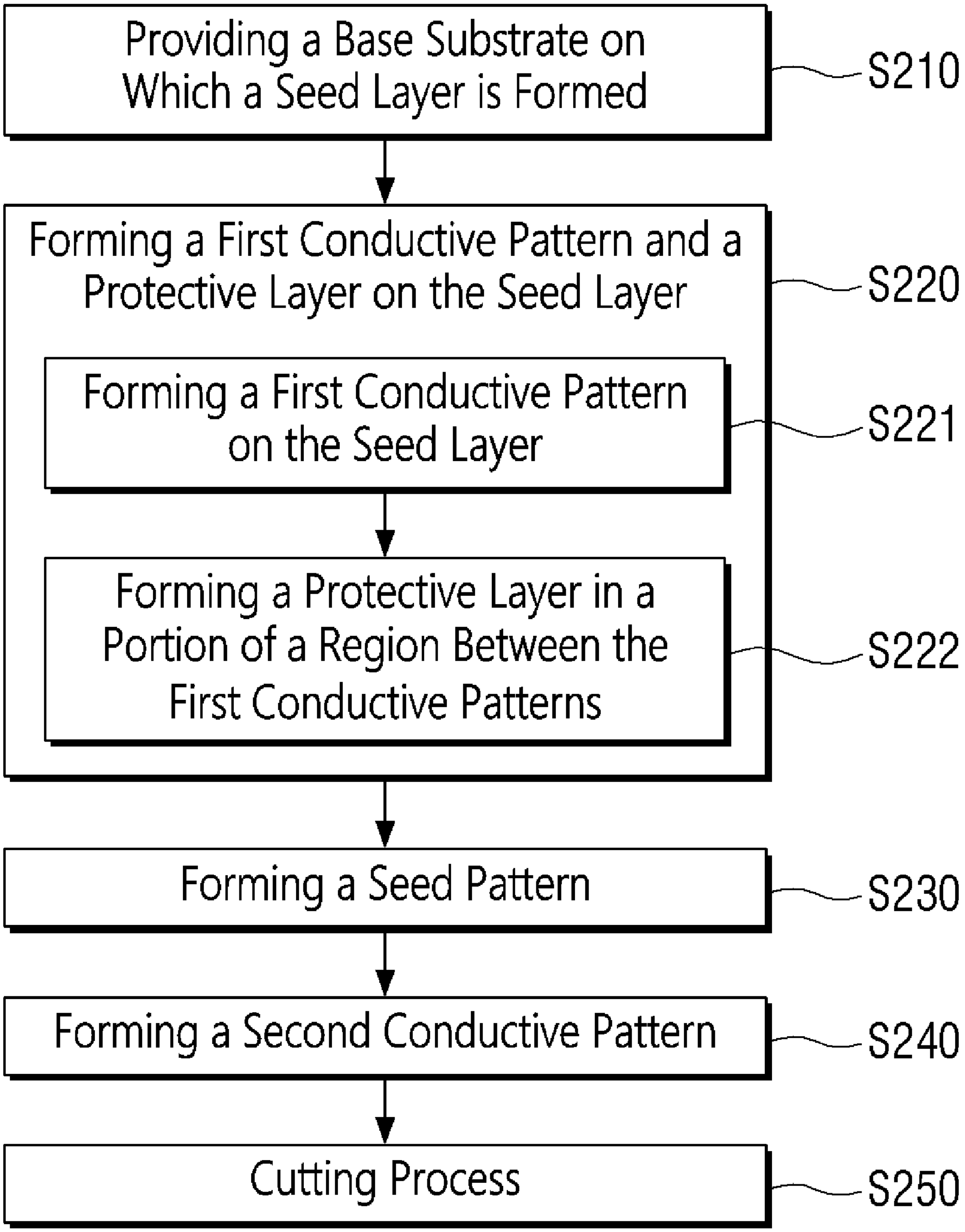

[FIG. 8]
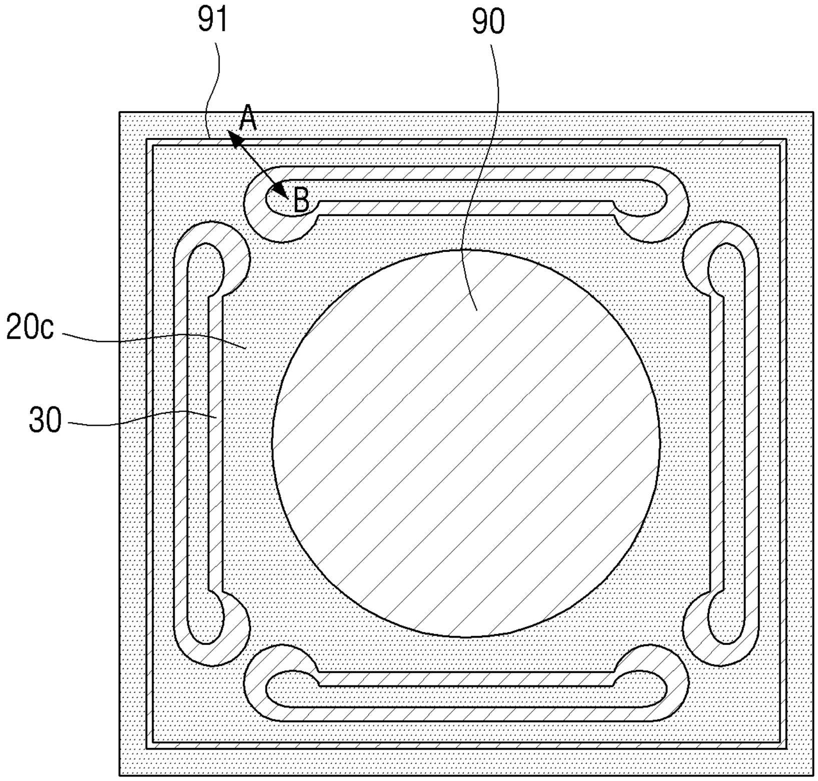
[FIG. 9]
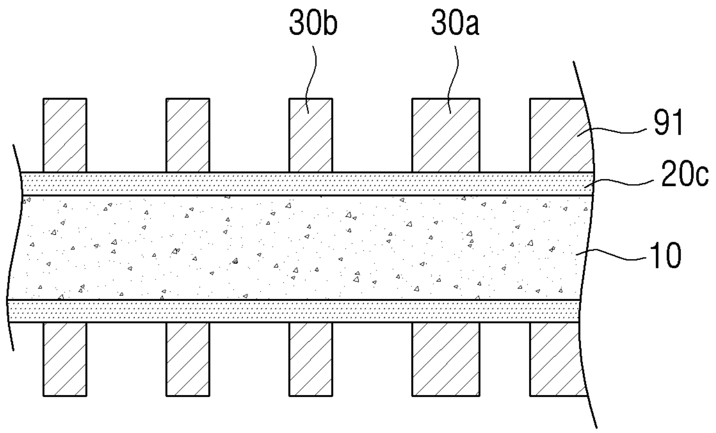

[FIG. 10]
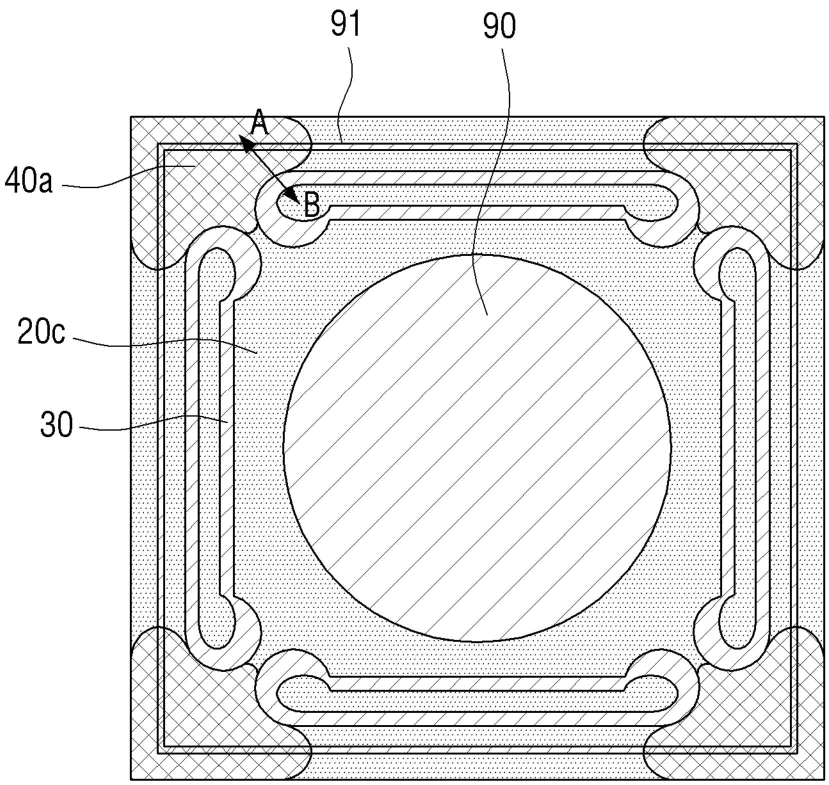
[FIG. 11]
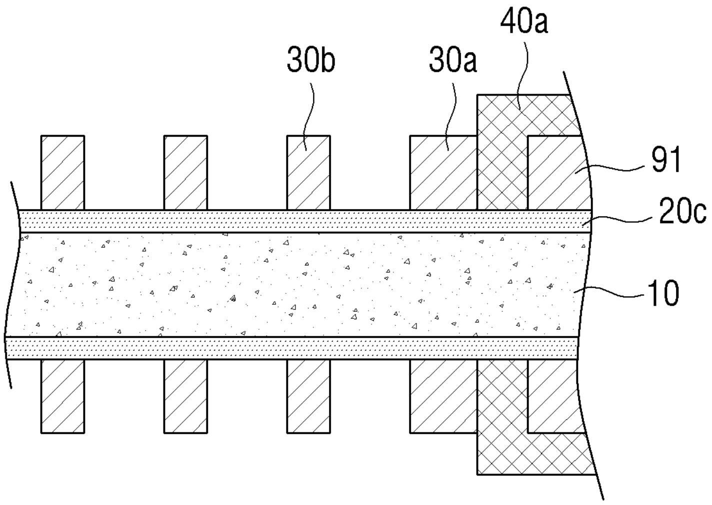

[FIG. 12]
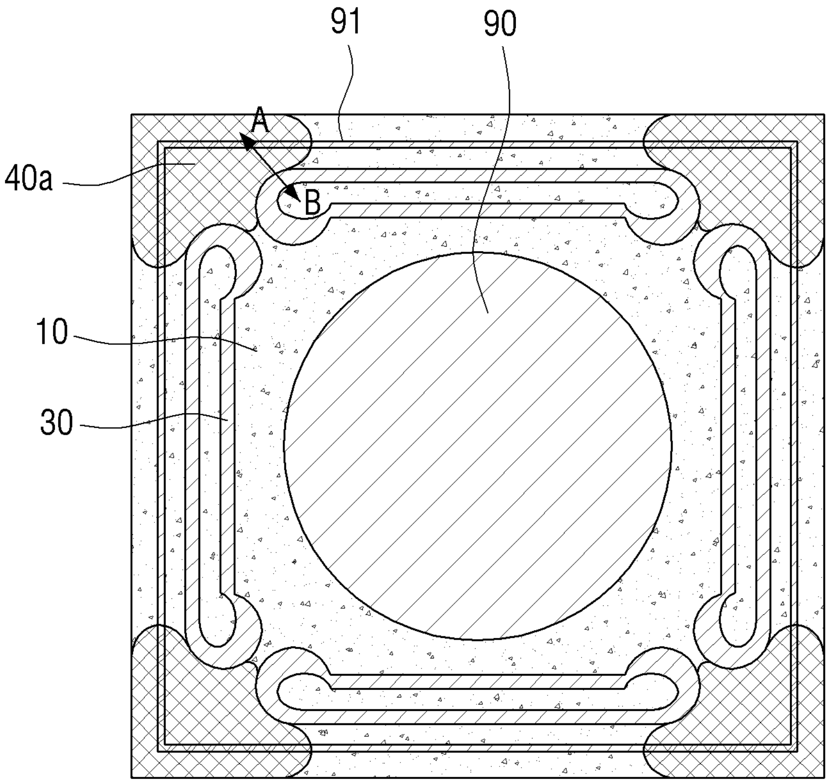
[FIG. 13]
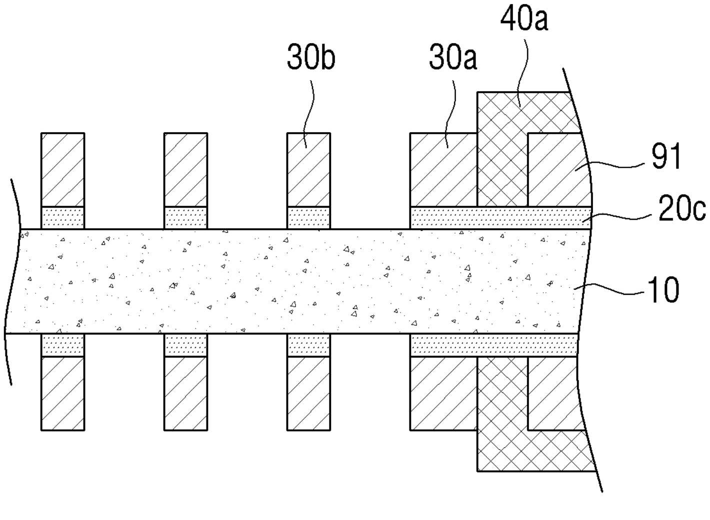

[FIG. 14]
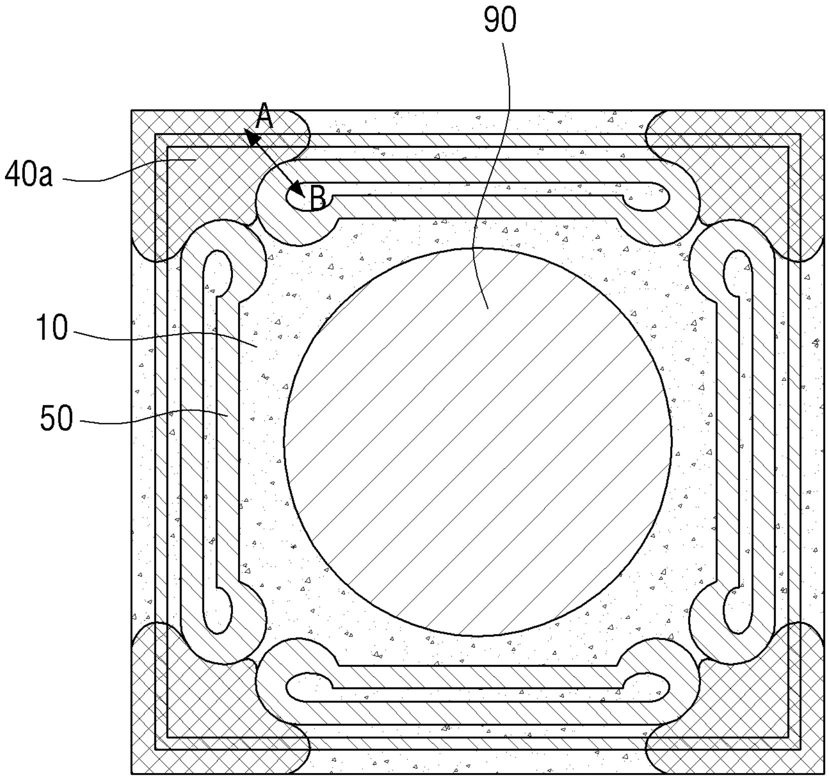
[FIG. 15]
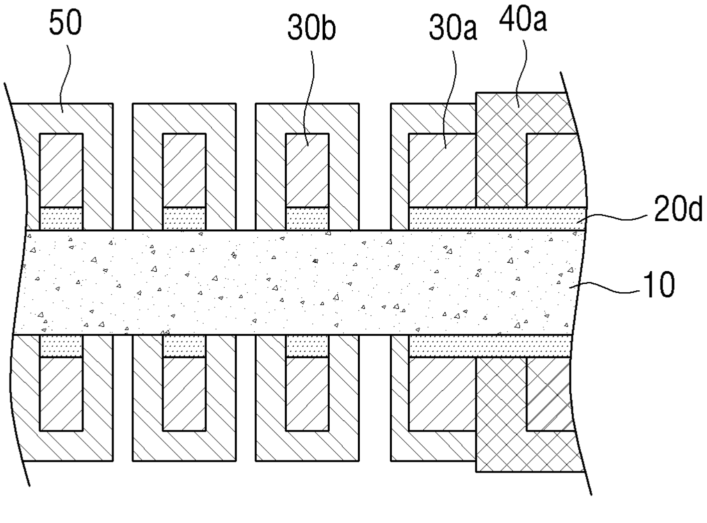

[FIG. 16]
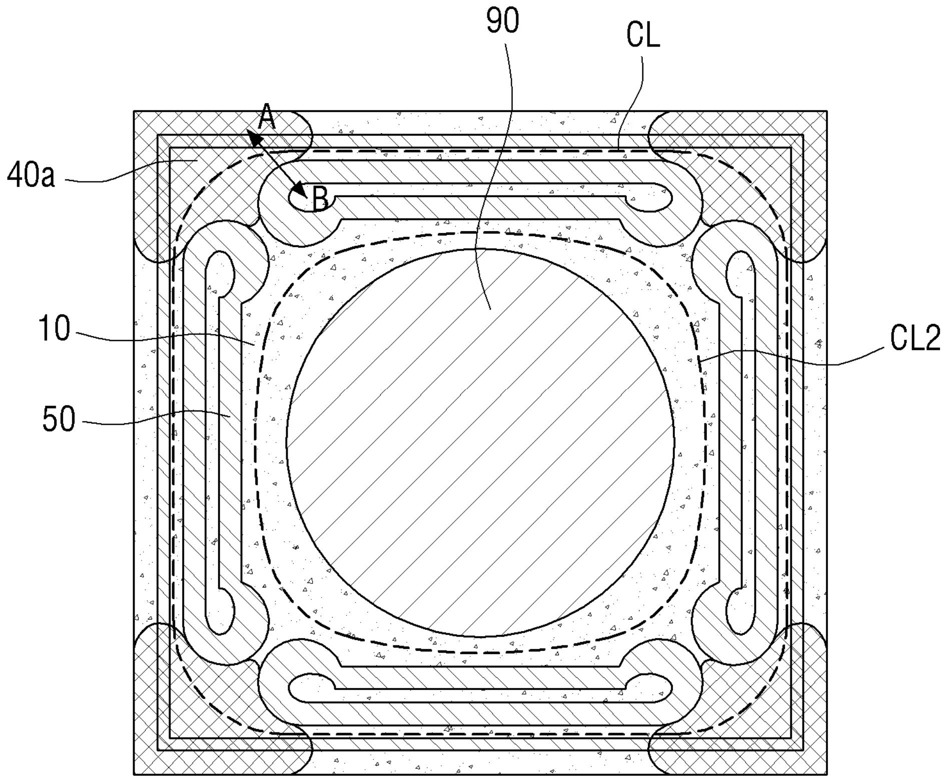

COIL DEVICE AND METHOD FOR MANUFACTURING THE SAME

CROSS-REFERENCE TO RELATED APPLICATION

The present application is a continuation of International Patent Application No. PCT/KR2019/007944, filed on Jul. 1, 2019, which is based upon and claims the benefit of priority to Korean Patent Application No. 10-2018-0077505 filed on Jul. 4, 2018. The disclosures of the above-listed applications are hereby incorporated by reference herein in their entirety.

BACKGROUND

1. Technical Field

The present invention relates to a coil device and a method for manufacturing the same.

2. Description of the Related Art

Coil devices that induce or promote electromagnetic force are used in various fields such as vibration motors, antennas, generators, filters, inductors, magnetic disks, camera modules, or the like. Among them, in the field of camera modules, the coil device may be applied to an actuator that mechanically adjusts a position or angle of an image sensor or lens optical system in an optical image stabilizer (OIS) method. As the camera modules mounted on small mobile devices become smaller within several tens of mm, the actuators mounted on the camera modules are also becoming smaller.

SUMMARY

For miniaturization of a coil device, a thin film type coil device in which a conductor pattern is formed in a spiral shape on an upper surface of a substrate is mainly used. Recently, in order to achieve a fine pitch of the conductor pattern formed on the upper surface of the substrate, while securing an electromagnetic force that may be driven by an actuator, a technique of extending a thickness of the conductor pattern has been developed.

However, in order to increase the thickness in a plating process of the conductor pattern, the pattern could not maintain a constant shape as a plating time continued. In addition, due to the plating deviation, an upper part of the conductor pattern was over-plated, so that a fine pattern interval could not be maintained, and thus a circuit failure problem such as a short occurred. Further, as a lead-in wiring is plated and thickened at the same time as the conductor pattern, the workability deteriorates in a processing step of removing the lead wiring. Moreover, the conductor pattern and/or the lead-in wiring have a surface that is not smooth due to a burr, or a problem of appearance damage occurs due to an impact force continuously applied.

Aspects of the present invention provide a coil device that minimizes defects and may increase a thickness of a conductor pattern.

Aspects of the present invention also provide a method for manufacturing a coil device that minimizes defects and may increase a thickness of a conductor pattern.

However, aspects of the present invention are not restricted to those set forth herein. The above and other aspects of the present invention will become more apparent to one of ordinary skill in the art to which the present invention pertains by referencing the detailed description of the present invention given below.

An aspect of a coil device of the present invention for achieving the objects described above includes: a base substrate; a seed pattern formed on the base substrate and including a seed region and a lead-in wiring region; a first conductive pattern formed on the seed region; a second conductive pattern formed on at least a portion of the first conductive pattern; and a protective layer formed to contact at least one or more of the base substrate, the seed pattern, the first conductive pattern, and the second conductive pattern, in which the seed pattern of the lead-in wiring region extends to a cut line.

Here, the seed pattern may be formed to have a thickness of 0.1 μm~5 μm.

In addition, a ratio of a thickness h1 and a width a of the first conductive pattern may be 1:1 to 5:1. A width b of the second conductive pattern may be 1 to 50 times an interval s between adjacent second conductive patterns. A thickness h2 of the second conductive pattern may be 1.01 to 50 times an interval s between adjacent second conductive patterns.

In addition, the first or second conductive pattern may include an n-th pattern formed along an n-th side or formed to be surrounded by a corner region connecting the n-th side and an n−1th side.

In addition, the protective layer may include a first protective layer formed in the lead-in wiring region, and a second protective layer formed in the lead-in wiring region or the seed region to contact at least one or more of the base substrate, the seed pattern, the first conductive pattern, the second conductive pattern, and the first protective layer.

The first protective layer may be disposed outside than the pattern disposed at the outermost side of the first conductive patterns.

In addition, an electronic device may include the coil device described above.

An aspect of a method for manufacturing a coil device of the present invention for achieving another object described above may include providing a base substrate having a seed layer formed thereon, forming a first conductive pattern and a protective layer on the seed layer, forming a seed pattern by removing the seed layer exposed by the first conductive pattern and the protective layer, and forming a second conductive pattern on at least a portion of the first conductive pattern.

Here, forming the first conductive pattern and the protective layer may include forming the first conductive pattern including a plurality of partial patterns and a dummy pattern on the seed layer, in which the plurality of partial patterns include a first partial pattern disposed at the outermost side of the plurality of partial patterns, and a second partial pattern disposed inside than the first partial pattern, and in which the dummy pattern is disposed outside than the first partial pattern, and after forming the first conductive pattern, forming the protective layer between the first partial pattern and the dummy pattern.

Here, it may further include a process of removing the protective layer after forming the seed pattern.

In addition, the seed pattern is exposed in at least a portion of a corner region of the base substrate, and forming the second conductive pattern may include forming the second conductive pattern by a plating method by applying at least one of a current and a voltage through the seed pattern exposed to the corner region.

In addition, it may include, after forming the second conductive pattern, a process of further forming the protective layer in contact with at least one of the base substrate, the seed pattern, the first conductive pattern, and the second conductive pattern.

In addition, it may further include, after forming the second conductive pattern, cutting the first partial pattern, the protective layer, the seed pattern, and the base substrate.

Other specific details of embodiments are included in the detailed description and drawings.

According to the present invention, defects of a coil device may be minimized, and a thickness of a conductor pattern in the coil device may be increased.

BRIEF DESCRIPTION OF THE DRAWINGS

The above and other aspects and features of the present invention will become more apparent by describing in detail exemplary embodiments thereof with reference to the attached drawings, in which:

FIG. 1 is a plan view of a coil device according to some embodiments of the present invention;

FIG. 2 is a cross-sectional view taken along line A-B of FIG. 1;

FIG. 3 is a plan view of a coil device according to some embodiments of the present invention;

FIGS. 4A and 4B are cross-sectional views taken along line A-B of FIG. 3;

FIG. 5 is a plan view for explaining a base substrate of FIGS. 1 to 4;

FIGS. 6A and 6B are plan views illustrating a seed pattern of FIGS. 1 to 4;

FIG. 7 is a flow chart illustrating a method for manufacturing a coil device according to some embodiments of the present invention;

FIGS. 8, 10, 12, 14, and 16 are plan views for explaining each step of FIG. 7; and FIGS. 9, 11, 13, and 15 are cross-sectional views for explaining each step of FIG. 7.

DETAILED DESCRIPTION OF THE EMBODIMENTS

Hereinafter, preferred embodiments of the present invention will be described in detail with reference to the accompanying drawings. Benefits and features of the present invention, and methods for achieving them will be clarified with reference to embodiments described below in detail together with the accompanying drawings. However, the present invention is not limited to the embodiments disclosed below, but may be implemented in various different forms. The embodiments are provided only to make the disclosure of the present invention complete, and to fully inform the scope of the invention to those skilled in the art to which the present invention pertains. The invention is only defined by the scope of the claims. Like reference numerals refer to like elements throughout the specification.

When it is referred that elements are “on” or “above” the other elements, it includes a case where other elements are interposed in the middle as well as directly above other elements. On the other hand, when it is referred that elements are “directly on” or “directly above” other elements, it indicates that there are no intervening elements or layers.

The spatially relative terms “below,” “beneath,” “lower,” “above,” “upper,” or the like may be used to easily describe the correlation between one element and other elements as shown in the drawings. The spatially relative terms should be understood as terms including different directions of an element in use or operation in addition to the directions shown in the drawings. For example, if elements shown in the drawings are turned over, elements described as “below” or “beneath” of other elements may be placed “above” other elements. Accordingly, an exemplary term “below” may include both directions below and above. Elements may also be oriented in different directions, so that the spatially relative terms may be interpreted depending on the orientation.

Although the first, second, etc. are used to describe various elements, components, and/or sections, it goes without saying that these elements, components, and/or sections are not limited by these terms. These terms are only used to distinguish one element, component, or section from other elements, components, or sections. Accordingly, it goes without saying that a first element, a first component, or a first section mentioned below may be a second element, a second component, or a second section within the technical spirit of the present invention.

The terms used herein are for the purpose of describing embodiments and are not intended to be limiting of the present invention. Herein, the singular also includes the plural unless specifically stated otherwise in the phrase. The terms “comprises” and/or “comprising” as used herein do not exclude the presence or addition of one or more other components, steps, operations, and/or elements mentioned.

Unless otherwise defined, all terms (including technical and scientific terms) used herein may be used in a sense that may be commonly understood by those of ordinary skill in the art. In addition, the terms defined in the commonly used dictionaries are not ideally or excessively interpreted unless they are specifically defined clearly.

Hereinafter, embodiments of the present invention will be described in detail with reference to the accompanying drawings. In the description with reference to the accompanying drawings, the same or corresponding components are assigned the same reference numbers regardless of drawing numbers, and redundant description thereof will be omitted.

FIG. 1 is a plan view of a coil device according to some embodiments of the present invention. FIG. 2 is a cross-sectional view taken along line A-B of FIG. 1. FIG. 3 is a plan view of a coil device according to some embodiments of the present invention. FIGS. 4A and 4B are cross-sectional views taken along line A-B of FIG. 3. FIG. 5 is a plan view for explaining a base substrate of FIGS. 1 to 4. FIG. 6 is a plan view illustrating a seed pattern of FIGS. 1 to 4.

First, referring to FIGS. 1 and 2, a coil device 100 of the present invention includes a base substrate 10, a seed pattern 20, a first conductive pattern 30, a protective layer 40, a second conductive pattern 50, or the like.

The base substrate 10 may be a flexible substrate or a rigid substrate. For example, the base substrate 10 may be made of a material such as polyimide, PET, polyethylene naphthalate, polycarbonate, epoxy, glass fiber, or the like, but is not limited thereto. Hereinafter, the base substrate 10 will be exemplary described as a polyimide film.

In addition, the base substrate 10 may be any shape as long as it may implement a coil device. As shown in FIG. 5, the base substrate 10 include, for example, four sides 11, 12, 13, and 14, and four corner regions 11*a*, 12*a*, 13*a*, and 14*a* connecting the four sides 11, 12, 13, and 14. Here, the corner regions 11*a*, 12*a*, 13*a*, and 14*a* may have a round chamfered shape, and an opening 15 may be formed inside the base substrate 10.

The seed pattern 20 is formed on the base substrate 10. In FIG. 2, it is shown that it is formed on both surfaces of the base substrate 10, but is not limited thereto. The seed pattern 20 may be in the form of patterning conductive metals such as Ni, Cr, or Cu, or a thin film including them. The seed pattern 20 may be formed, for example, to a thickness of 0.1 μm~5 μm, preferably 0.5 μm~1.5 μm. Such a thickness of the seed pattern 20 may apply sufficient current to form the first conductive pattern 30 and/or the second conductive pattern 50 to be described later, and may suppress a defect problem that occurs during processing such as cutting.

In addition, the seed pattern 20 includes a seed region 20*b* and a lead-in wiring region 20*a*. Here, the seed region 20*b* is a region that is a basis when forming the first conductive pattern 30 and/or the second conductive pattern 50 (i.e., a region serving as a seed), and the lead-in wiring region 20*a* is a region for serving as a wiring to receive current when forming the first conductive pattern 30 and/or the second conductive pattern 50.

The first conductive pattern 30 is formed on the seed region 20*b*. Although not clearly illustrated in FIG. 1, the first conductive pattern 30 may have a spiral shape, but is not limited thereto. It may be of any shape as long as it may create sufficient driving electromagnetic force in an actuator. In addition, the first conductive pattern 30 may be formed in a single or plural number, and is not limited to the shapes shown in FIGS. 6A and 6B.

As an example, an n-th pattern may be formed to be elongated along n sides formed on the base substrate 10 (n=a natural number of 2 or more). In other words, when the base substrate 10 includes four sides 11, 12, 13, and 14, and four corner regions 11*a*, 12*a*, 13*a*, and 14*a*, the first conductive pattern 30 may include first to fourth patterns formed elongated along the four sides 11, 12, 13, and 14, respectively. Referring to FIG. 6A, the first pattern may be formed on the seed region 20*b* extending along the first side 11 to the corner regions 11*a* and 14*a* (i.e., the corner regions 11*a* and 14*a* disposed in the upper left and upper right in FIG. 6A). Likewise, the second pattern may be formed on the seed region 20*b* extending along the second side 12 to the corner regions 11*a* and 12*a* (i.e., the corner regions 11*a* and 12*a* disposed in the upper left and lower left in FIG. 6A). Likewise, a third pattern may be formed to be elongated along the third side 13, and a fourth pattern may be formed to be elongated along the fourth side 14.

As another example, an n-th pattern may be formed so as to be surrounded by the corner regions formed by an n-th side and an n−1th side (n=a natural number of 2 or more) of the base substrate 10. Referring to FIG. 6B, the first pattern may be formed with a profile similar to a shape of the corner region 11*a* formed by a first side and a second side. Likewise, the second pattern may be formed with a profile similar to a shape of the corner region 12*a* formed by a second side and a third side, and the third and fourth patterns may be formed in the corner regions 13*a* and 14*a*, respectively.

Alternatively, although not shown, a single or a plurality of first conductive patterns 30 and/or second conductive patterns 50 may be formed on the base substrate having a shape such as a circular or elliptical shape having a curvature.

The first conductive pattern 30 includes a plurality of partial patterns 30*a* and 30*b*. As shown in FIG. 2, reference numeral 30*a* denotes a first partial pattern disposed at the outermost side, and reference numeral 30*b* denotes a second partial pattern disposed inside than the first partial pattern.

A ratio of a thickness h1 and a width a of the first conductive pattern 30 may be 1:1 to 10:1. More specifically, in the case of the inner first conductive pattern 30*b* excluding the outermost first partial pattern 30*a*, it may be 3:1 to 5:1. The outermost first partial pattern 30*a* means the first partial pattern 30*a* closest to a cut line CL of the base substrate 10. The inner first conductive pattern 30*b* refers to a pattern disposed inside than the outermost first partial pattern 30*a*. This ratio corresponds to an optimum ratio capable of minimizing an interval between adjacent second conductive patterns 50 while the second conductive pattern 50 to be described later is formed in a similar profile to the first conductive pattern 30.

The protective layer 40 is made of a material different from the first conductive pattern 30, and may be, for example, a photosensitive resin or a solder resist as an insulating material. In addition, the protective layer 40 includes a first protective layer 40*a* that protects the seed pattern 20, more specifically, the seed pattern 20*a* of the lead-in wiring region, and a second protective layer 40*b* formed in the lead-in wiring area or the seed area in contact with at least one of the base substrate 10, the seed pattern 20, the first conductive pattern 30, the first protective layer 40*a*, and the second conductive pattern 50 to be described later to protect it.

As shown in FIG. 4A, the first protective layer 40*a* covers at least a portion of a sidewall of the first conductive pattern 30. In addition, the first passivation layer 40*a* may be disposed outside than the outermost pattern (e.g., the rightmost second partial pattern 30*a* in FIG. 4A) of the first conductive pattern 30, and may be formed equal to or higher than the second partial pattern 30*a*.

Alternatively, as shown in FIG. 4B, the first protective layer 40*a* may be formed lower than the second partial pattern 30*a*. In this case, the sidewall of the second partial pattern 30*a* (the sidewall close to the first protective layer 40*a*) is exposed, so that the second conductive pattern 50 may also be formed on the sidewall of the second partial pattern 30*a* close to the first protective layer 40*a*.

In addition, when the first conductive pattern 30 is formed as shown in FIG. 3, the first protective layer 40*a* may be formed on the corner regions 11*a*, 12*a*, 13*a*, and 14*a* and outside the first to fourth patterns. Accordingly, the first protective layer 40*a* may be formed on the upper left, upper right, lower left, and lower right corner regions 11*a*, 12*a*, 13*a*, and 14*a* of the base substrate 10 of FIG. 6.

Although described later, with respect to the seed layer, after forming the first conductive pattern 30, the seed pattern 20 is formed by removing the seed layer exposed between the first conductive patterns 30 for insulation between the first conductive patterns. 30 However, in the coil device 100 according to some embodiments of the present invention, by forming the first protective layer 40*a* on a portion of the seed layer (i.e., corresponding to the lead-in wiring region 20*a*), the seed layer under the first protective layer 40*a* is not removed. The seed layer that has not been removed is used as a lead-in wiring (or lead-in pad) when forming the second conductive pattern 50. In addition, due to the first protective layer 40*a*, the lead wiring to which a current is applied is not plated together when the second conductive pattern 50 is formed. Therefore, a thickness of the lead-in wiring does not increase and remains constant.

The first protective layer 40*a* may be selectively removed after forming the second conductive pattern 50. Even if the first protective layer 40*a* is removed, the seed pattern 20*b* of the lead-in wiring region may be protected by the second protective layer 40*b*, and rather, the protective layer 40 is formed on a final product without distinction between layers. Therefore, durability is improved, and surface irregularities may be minimized.

The second conductive pattern 50 is formed on at least a portion of a sidewall of the first conductive pattern 30 exposed by the first protective layer 40*a* and an upper surface of the first conductive pattern 30. In addition, the second conductive pattern 50 may be formed on at least a portion of a sidewall of the seed pattern 20 or an upper surface of the first protective layer 40*a*. As illustrated, the second conductive pattern 50 may be formed along the sidewall of the seed pattern 20, the sidewall and the upper surface of the first conductive pattern 30. The second conductive pattern 50 may be formed in a plating method by receiving at least one of a current and a voltage through the seed pattern 20 formed on at least a portion of the corner region of the base substrate 10.

As shown, the second conductive pattern 50 may be formed in an area that is enlarged compared to an area of the first conductive pattern 30. Here, an area of the second conductive pattern 50 means including the area of the first conductive pattern 30. In addition, a width b of the second conductive pattern 50 may be formed to be 1 to 50 times, and preferably 5 to 15 times, compared to an interval s between adjacent second conductive patterns 50. In addition, a thickness h2 of the second conductive pattern 50 may be formed to be 1.01 to 50 times, preferably 5 to 20 times, compared to the interval s between adjacent second conductive patterns 50. In other words, in the coil device according to some embodiments of the present invention, both the width and the thickness of the conductive pattern may be extended compared to the prior art. In addition, the interval between the conductive patterns is reduced, and thus miniaturization is possible. As a result, it is possible to realize a high electromagnetic force while miniaturization and high integration are possible. In addition, a range of the width b and the thickness h2 of the second conductive pattern 50 have been described based on the interval s. This is because it is a condition that should be considered as important as the width b or the thickness h2 to prevent a short between the second conductive patterns 50 adjacent to each other, or to increase the number of turns of a coil without interfering with the formation of a magnetic field.

The protective layer 40 and the seed pattern 20 extend to the cut line CL. In other words, the protective layer 40 and the seed pattern 20 may be exposed on a surface where the cut line CL is formed.

In other words, the cut line CL of the protective layer 40 and the cut line CL of the seed pattern 20 are connected. Likewise, the cut line CL of the seed pattern 20 and the cut line CL of the base substrate 10 are connected. Although described later, since the protective layer 40, the seed pattern 20, and the base substrate 10 are simultaneously cut through a cutting process, the cut lines CL may be connected to each other. Here, the cut line CL may correspond to an outer peripheral surface of a coil device (final product). Naturally, depending on a design, not a single cutting process, but several or different types of cutting processes may be used. In this case, the cut lines CL of the protective layer 40, the seed pattern 20, and the base substrate 10 may not be connected to each other.

In addition, as described above, as the protective layer 40 is formed outside the outermost first partial pattern 30*a*, the seed pattern 20 formed under the protective layer 40 also extends to the cut line CL. In other words, a thickness of a conductive material cut by the cutting process corresponds to a thickness of the seed pattern 20. Compared to a conventional coil device, the thickness of the conductive material to be cut by the cutting process is significantly thinner. Therefore, processing is easy, and problems such as a burr formed on a cut end surface or a circuit connection failure may be solved. In addition, when the protective layer 40, preferably the first protective layer 40*a* is formed on an inner side of the outermost first partial pattern 30*a*, a circuit failure such as a short may be caused by the seed pattern 20 formed underneath. Accordingly, in some embodiments of the present invention, the protective layer 40 is formed outside the outermost first partial pattern 30*a*.

A shape of the protective layer 40 is the same as the first conductive pattern 30 or is formed in various ways according to a method, such as formed as a curved upper surface. Therefore, it is not limited to the shape shown in the drawings.

In summary, the protective layer 40 may be partially formed in a single or a plurality of regions of at least one surface of the base substrate 10. In other words, by the seed pattern 20 formed under the partially formed protective layer 40, while the second conductive pattern 50 is formed, insulation between the first conductive patterns 30 formed in advance may be secured. More specifically, the protective layer 40 is formed so that the cut line CL of the protective layer 40 is connected to the cut line CL of the base substrate 10. Therefore, the seed pattern 20 extends to the cut line CL to receive an external current. More specifically, the protective layer 40 is formed in a sheet form with respect to the corner region of the base substrate 10 on which the spiral-shaped first conductive pattern 30 is not formed. Therefore, unlike the conventional separately formed bar-shaped lead-in line, an area in contact with the cut line CL is increased, and a current may be more efficiently applied to the first conductive pattern 30 through the seed pattern 20 of the lead-in wiring region having a thinner thickness.

The coil device according to some embodiments of the present invention may be applied to an electronic device. The electronic device may be a vibration motor, an antenna, a generator, a filter, an inductor, a magnetic disk, and a camera module, but is not limited thereto.

Hereinafter, a method for manufacturing a coil device according to some embodiments of the present invention will be described with reference to FIGS. 7 to 16.

FIG. 7 is a flow chart illustrating a method for manufacturing a coil device according to some embodiments of the present invention. FIGS. 8, 10, 12, 14, and 16 are plan views for explaining each step of FIG. 7. FIGS. 9, 11, 13, and 15 are cross-sectional views for explaining each step of FIG. 7. Hereinafter, for convenience of description, the description is based on the SAP (semi additive plating) method, but is not limited thereto. Hereinafter, for convenience of description, descriptions with regard to FIGS. 1 to 6 are omitted.

Referring to FIGS. 8 and 9, a base substrate 10 on which a seed layer 20*c* is formed is provided (see S210 of FIG. 7). As shown, the seed layer 20*c* may be formed on the base substrate 10 by bonding, electroless or electrolytic plating, or deposition. Alternatively, it is also possible to use the base substrate 10 in which the seed layer 20*c* is formed in advance on one or both surfaces.

Subsequently, a first conductive pattern 30 and a protective layer 40 are formed on the seed layer 20*c* (see S220 of FIG. 7). Specifically, as shown in FIGS. 8 and 9, the first conductive pattern 30 is formed on the seed layer 20*c* (see S221 of FIG. 7). The first conductive pattern 30 may be formed by using the seed layer 20*c* as a lead-in wiring through a method such as SAP or etching, but is not limited thereto. In addition, the first conductive pattern 30 may have a spiral shape capable of providing a magnetic force, and may be formed in various shapes as necessary. In addition, when the first conductive pattern 30 is formed, dummy patterns 90 and 91 for more accurate pattern formation may be additionally formed. The dummy pattern 91 may have a rectangular shape, for example, and the dummy pattern 90 may have a circular shape, for example. The first conductive pattern 30 may be formed between the dummy pattern 90 and the dummy pattern 91. Although not shown, a recognition pattern, a reinforcement pattern, a heat radiation pattern, etc. may be formed for realizing effects such as alignment, reinforcement, or heat radiation of the pattern.

For example, the first conductive pattern 30 may include a first pattern to a fourth pattern, and each of the first to fourth patterns may be formed to be elongated along four sides of the base substrate 10.

FIG. 9 is a cross-sectional view of the spiral-shaped first conductive pattern 30 in FIG. 8 taken along an A-B direction. The first conductive pattern 30 includes a plurality of partial patterns 30*a* and 30*b*. A first partial pattern 30*a* may be disposed on the outermost side of the plurality of partial patterns 30*a* and 30*b*, and the second partial pattern 30*b* may be disposed inside than the first partial pattern 30*a*. Also, the dummy pattern 91 may be disposed outside the first partial pattern 30*a*.

In addition, as shown in FIGS. 10 and 11, a protective layer, that is, a first protective layer 40*a* is formed in a portion of a region between the first conductive patterns 30 (see S222 of FIG. 7). Specifically, the first protective layer 40*a* is disposed outside than the first conductive pattern 30. In other words, the first protective layer 40*a* may be disposed outside than the outermost pattern of the first conductive patterns 30. As described above, when the dummy pattern 91 is disposed outside the first conductive pattern 30, it may be formed in a region between the first conductive pattern 30 and the dummy pattern 91. In other words, the first protective layer 40*a* may be formed between the first partial pattern 30*a* and the dummy pattern 91. Also, the first protective layer 40*a* may be formed outside the dummy pattern 91.

A thickness of the first protective layer 40*a* is shown to be thicker than a thickness of the first partial pattern 30*a* in FIG. 11, but is not limited thereto. The thickness of the first protective layer 40*a* may vary depending on a design. For example, the first protective layer 40*a* may be formed to be thinner than the thickness of the first conductive pattern 30 and may not cover an upper surface of the first conductive pattern 30.

More specifically, as shown in FIG. 8, the first protective layer 40*a* may be formed on corner regions 11*a*, 12*a*, 13*a*, and 14*a* and outside the first to fourth patterns of the first conductive pattern 30. In other words, the first protective layer 40*a* may be formed on the upper left, upper right, lower left, and lower right corner regions 11*a*, 12*a*, 13*a*, and 14*a* of the base substrate 10 of FIG. 8.

The first protective layer 40*a* may be formed using a method such as screen printing, film lamination, or photolithography, but is not limited thereto. For example, the first protective layer 40*a* may be left between the first partial pattern 30*a* and the dummy pattern 91 on the first conductive pattern 30 by a photolithography method. Alternatively, the first protective layer (i.e., resist) may be partially applied to a substrate on which a coil is formed by a printing method. Here, resist viscosity or the like may be adjusted so that it is applied only to the corner area.

Subsequently, the seed layer 20*c* exposed by the first conductive pattern 30 and the first protective layer 40*a* is removed to form a seed pattern 20*d* (see S230 in FIG. 7).

Specifically, as shown in FIGS. 11 and 12, since the seed layer 20*c* between the first conductive pattern 30 and the dummy pattern 91 is covered by the first protective layer 40*a*, it is not removed. On the other hand, since the seed layer 20*c* between the first partial pattern 30*a* and the second partial pattern 30*b* is exposed, the exposed seed layer 20*c* is removed to complete the seed pattern 20*d*. A removal method may be variously applied, such as wet etching or dry etching, and is not limited to a specific method.

In addition, after the seed pattern 20 is formed, the first protective layer 40*a* may be selectively removed, and it is applied without being limited to a specific method. As a material constituting the seed pattern 20 and the first protective layer 40*a* is different, damage to the seed pattern 20 may be less when the first protective layer 40*a* is removed. Optionally, a method such as masking may be adopted and applied. In addition, the seed pattern 20 may be continuously protected by the second protective layer 40*b* to be described later.

Subsequently, a second conductive pattern 50 is formed on at least a portion of a sidewall of the first conductive pattern 30 and an upper surface of the first conductive pattern 30 (see S240 of FIG. 7).

Specifically, as shown in FIGS. 13 and 14, the second conductive pattern 50 is formed along a sidewall of the seed pattern 20*d* and the sidewall/upper surface of the first conductive pattern 30. The seed pattern 20*d* is exposed in at least a portion of the corner area of the base substrate 10. When forming the second conductive pattern 50, the second conductive pattern 50 may be formed by plating by applying a current through the seed pattern 20*d* exposed to the corner region. In other words, the seed pattern 20*d* exposed in the corner region serves as a lead-in wiring for the current. A thickness and a shape of the second conductive pattern 50 may be adjusted by adjusting plating conditions such as plating time or current density.

Subsequently, a second protective layer 40*b* is formed to cover at least one of the base substrate 10, the seed pattern 20*d*, the first conductive pattern 30, the first protective layer 40*a*, and the second conductive pattern 50. Subsequently, a cutting process is performed to complete the coil device shown in FIGS. 1 to 4 (see S250 of FIG. 7).

Specifically, the cutting process is performed along cut lines CL and CL2 shown in FIG. 16 to remove unnecessary dummy patterns 90 and 91 from a final structure. In other words, after forming the second conductive pattern 50, the first protective layer 40*a*, the seed pattern 20*d*, and the base substrate 10 disposed between the first partial pattern 30*a* and the dummy pattern 91 are cut. Thus, the dummy pattern 91 on the outside is removed. Further, the dummy pattern 90 on the inside is also removed. Through the cutting process, the cut lines CL and CL2 are formed. Through such a cutting process, as shown in FIGS. 1 and 2, the protective layer 40 and the seed pattern 20 extend to the cut line CL. In other words, the protective layer 40 and the seed pattern 20 may be exposed on a surface where the cut line CL is formed. The cut line CL of the protective layer 40 and the cut line CL of the seed pattern 20 are connected to each other, and the cut line CL of the seed pattern 20 and the cut line CL of the base substrate 10 are connected to each other.

The embodiments of the present invention have been described with reference to the accompanying drawings. However, it may be understood that those of ordinary skill in the art to which the present invention pertains may implement the present invention in other specific forms without changing its technical spirit or essential features. Therefore, it should be understood that the embodiments described above are exemplary in all respects and not restrictive.

INDUSTRIAL AVAILABILITY

The present invention may be applied to coil devices used in various fields such as vibration motors, antennas, generators, filters, inductors, magnetic disks, camera modules, or the like.

What is claimed is:

1. A coil device, comprising:

a base substrate;

a seed pattern formed on the base substrate and including a seed region and a lead-in wiring region;

a first conductive pattern formed on the seed region;

a second conductive pattern formed on at least a portion of the first conductive pattern; and a protective layer formed to contact at least one or more of the base substrate, the seed pattern, the first conductive pattern, and the second conductive pattern, wherein the seed pattern of the lead-in wiring region extends to a cut line, wherein the first conductive pattern is not formed on the seed pattern of the lead-in wiring region, and wherein the second conductive pattern covers an upper surface and a side surface of the seed pattern of the seed region, and the second conductive pattern does not cover the seed pattern of the lead-in wiring region.

2. The device of claim 1, wherein the seed pattern is formed to have a thickness of 0.1 μm ~ 5 μm.

3. The device of claim 1, wherein a ratio of a thickness h1 and a width a of the first conductive pattern is 1:1 to 5:1.

4. The device of claim 1, wherein a width b of the second conductive pattern is 1 to 50 times an interval s between adjacent second conductive patterns.

5. The device of claim 1, wherein a thickness h2 of the second conductive pattern is 1.01 to 50 times an interval s between adjacent second conductive patterns.

6. The device of claim 1, wherein the first or second conductive pattern comprises an n-th pattern formed along an n-th side or formed to be surrounded by a corner region connecting the n-th side and an n-1th side, where n=a natural number of 2 or more.

7. The device of claim 1, wherein the protective layer comprises a second protective layer formed in the lead-in wiring region and the seed region to contact at least one or more of the base substrate, the seed pattern, the first conductive pattern, and the second conductive pattern.

8. An electronic device comprising the coil device of claim 1.

* * * * *